Sept. 14, 1954 L. E. SETZER ET AL 2,689,345
AUTOMATIC APPROACH CONTROL
Filed June 25, 1949 2 Sheets-Sheet 1

INVENTORS
LOGAN E. SETZER
CHESTER B. WATTS, JR.
BY
ATTORNEY

Patented Sept. 14, 1954

2,689,345

UNITED STATES PATENT OFFICE 2,689,345

AUTOMATIC APPROACH CONTROL

Logan E. Setzer and Chester B. Watts, Jr., Indianapolis, Ind., assignors to International Standard Electric Corporation, New York, N. Y., a corporation of Delaware Application June 25, 1949, Serial No. 101,288

5 Claims. (Cl. 343—101)

This invention relates to radio navigation systems and particularly to automatic approach systems for mobile craft.

Previous automatic approach control arrangements operating on localizer course information transmitted from a remote station for guiding aircraft during landing operation have utilized rate circuits operating on the deviation of the aircraft's position with respect to the localizer course for damping the oscillations of the aircraft about the course during the landing operations. The rate circuit usually comprises a differentiating circuit operating on, for example, the direct current controlling the on-off course indicator of a localizer receiver arrangement. Thus the rate circuit operating on localizer received signals determines the rate at which the aircraft is approaching the on-course position and modifies the automatic approach control functions accordingly, i. e., the automatic control of rudder and ailerons. These arrangements, however, have been applicable only to relatively smooth localizer courses, since they have an inherent tendency to accentuate localizer course deviations or bends, while also being affected substantially by noise interference. By replacing the rate component of the previous automatic approach arrangements with the smoother signal from a homing adapter to be described, improved performance is obtained. The nature of the homing adapter renders it an excellent method for automatic flight on broad courses, while extending its application to crooked localizer courses and providing improved operation during noise interference.

An object of this invention is to provide an improved automatic approach control unit for operation on broad and crooked radio approach courses.

Another object of the invention is to provide a homing adapter for operation with the normal localizer control equipment for facilitating landing operation of aircraft.

In accordance with an embodiment of the invention a bridge circuit is provided for supplying both in phase and out of phase signals from a pair of spaced apart antennas. The in phase signals are modulated at a relatively low frequency rate and combined with the out of phase unmodulated signals after a 90° phase shift before application to a receiver. The receiver compares the phase of the detected receiver output with that of the low frequency modulating source to produce a control signal for operating a homing indicator. When used in conjunction with localizer receiver indications the heading information is of great value in assisting the pilot in bracketing the localizer course.

The signal which operates the homing indicator may also be fed into an automatic approach control equiment to replace the signals conventionally developed by a rate taking circuit and used to damp the oscillation of the airplane about the localizer course during automatic approach.

The above mentioned and other features and objects of the invention will become more apparent and the invention itself, though not necessarily defined by said features and objects, will be clearly understood by reference to the following description of an embodiment of the invention taken in connection with the accompanying drawings wherein.

Figure 1:
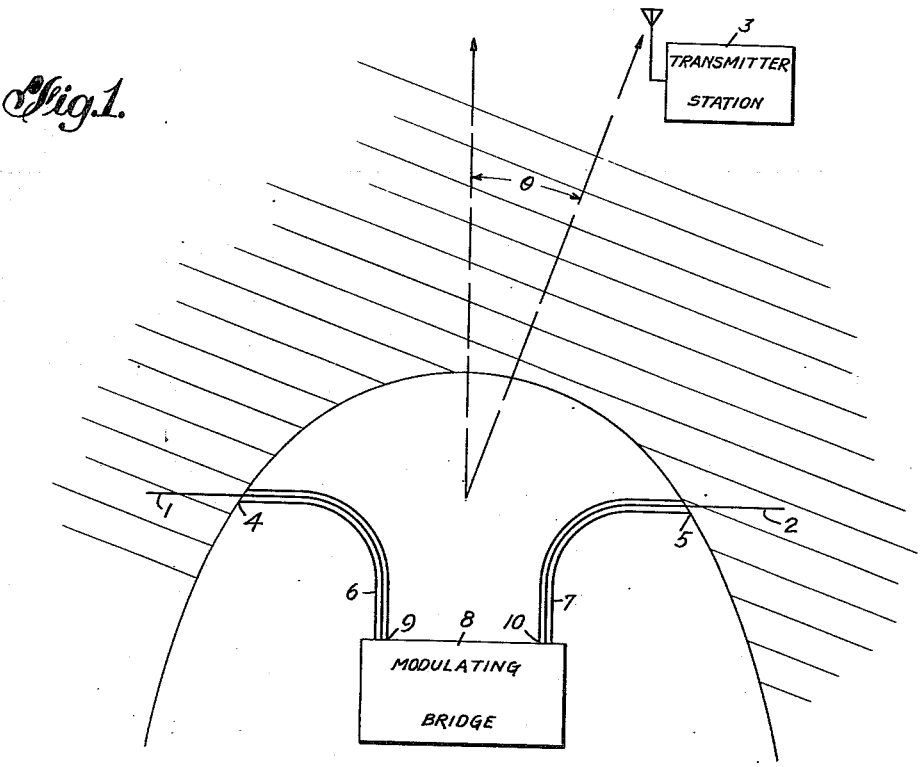
Fig. 1 illustrates an aircraft antenna installation for receiving radio navigation signals.
Figure 2A:
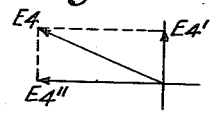
Figs. 2a through 2f are vector diagrams depicting the voltage relationships assisting in the various parts of the bridge arrangement of Fig. 3.
Figure 2B:
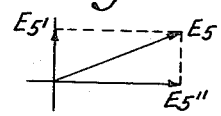

A homing adapter in accordance with the illustrated embodiment of the invention comprises two horizontal whip antennas 1 and 2 mounted on either side of the nose of an aircraft. As shown the craft heading makes an angle $\theta$ with respect to a remote radio transmitter station 3 which may, for example, be a localizer transmitter. Because antennas 1 and 2 are at different distances from the transmitter 3, the energy at points 4 and 5 will be out of phase by an amount dependent upon the spacing of the antennas and the operating frequency. The phase differences may be resolved into in-phase components and out-of-phase components at 90° to the in-phase components. The in-phase tangential fields of the incoming radio waves emanating from radio station 3 produce out of phase vector voltage components at points 4 and 5, while the out of phase components of the fields produce in phase voltage components at 4 and 5. The vector voltage diagrams for points 4 and 5 are shown in Figs. 2a and 2b, respectively. For waves arriving directly ahead ($\theta=0$), the in-phase components $E_4'$ and $E_5'$ (out-of-phase field components) are zero. For small values of θ, E4′ and E5′ are proportional to θ, and when θ becomes negative, E4′ and E5′ become negative (change phase 180°). Equal lengths of transmission line, 6 and 7, couple the received energy to the modulating bridge 8.

Figure 2E:
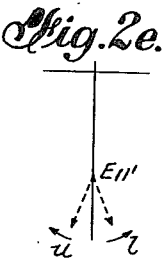
Figure 2C:
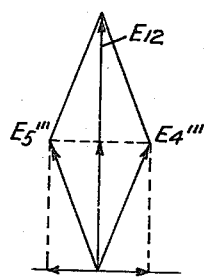
Figure 3:
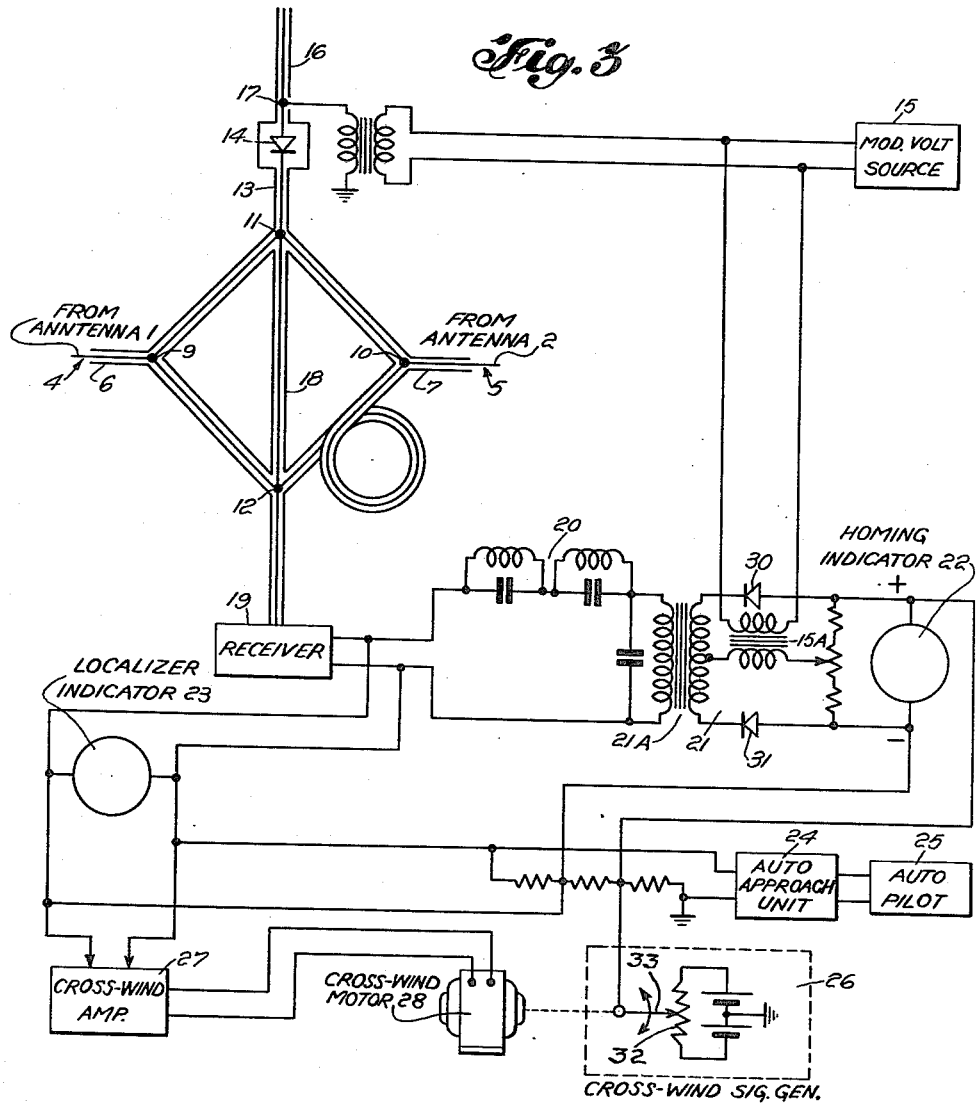
Fig. 3 illustrates partly in block diagram and partly in schematic circuit diagram an automatic approach control receiver using a modulating bridge arrangement for supplying homing information and localizer indications.

Referring now to Fig. 3 the energy received at points 9 and 10 of bridge 8 divide, part of the energy going towards point 11 and part towards point 12 in each case. At 12 the voltages E4‴ and E5‴, Fig. 2c, are produced by the energy from points 4 and 5. The voltage E4‴ lags the voltage E4 by 90°, while the voltage E5‴ lags the voltage E5 by 270° due to the construction of the bridge as shown in Fig. 3. It will be noted that points 9 and 10 are at diagonally opposite terminals of bridge 8, and that four arms are provided between these terminals and terminals 11 and 12. The arms 9—11, 10—11 and 9—12 are each 90 electrical degrees at the operating frequency while arms 10—12 are made a half wavelength longer than the other arms. These voltages combine to produce the voltage E12, shown in Fig. 2c.

Figure 2D:
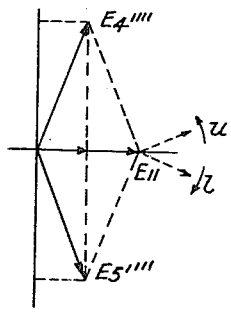

While the voltage E12 is shown as an unmodulated carrier, usually the localizer signals contain low frequency sidebands, as for example due to 90 and 150 cycle modulations at the ground station. For this reason, any additional low frequency modulation added to these voltages on the aircraft should be kept to a low percentage to minimize cross modulation products. The energies arriving at point 11 from points 9 and 10 produce voltages E4″″ and E5″″ as shown in Fig. 2d. These voltages combine to produce the voltage E11 at point 11 of the bridge. The voltage at point 11 is applied by means of the impedance transformer 13 to the modulating circuit 14 which may comprise a germanium crystal. The radio frequency resistance of the crystal is made to vary by impressing a low frequency modulating voltage, as for example at 400 cycles from the source 15. The line 16 comprises a quarter wavelength open-ended stub and is employed as a radio frequency by-pass at point 17. The line 13 is a quarter wavelength long and is terminated by the modulator circuit 14. Thus the line 13 presents a variable impedance at point 11 of the modulating bridge. This variation in impedance at point 11 causes the side bands $u$ and $l$ to appear on the voltage E11 as shown in Fig. 2d when the modulating voltage is applied to circuit 13.

Figure 2F:
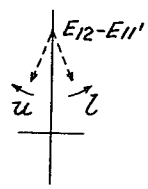

The voltage E11 with sidebands is transmitted over a quarter wavelength high impedance line 18 to point 12. By properly dimensioning the impedances of the various arms of the bridge arrangement it can be arranged that only a small portion of the modulated energy at 11 will be transmitted over line 18 to point 12. This is shown as E11′ in Fig. 2e. The energy transmitted from point 11 to point 12 via points 9 and 10, respectively will cancel since the two paths have a half wave difference in length. Thus the total resultant voltage at point 12 is E12—E11′ as shown in Fig. 2f. This voltage is fed to the receiver 19.

The receiver 19 in addition to providing the usual localizer course indication is arranged to detect the 400 cycle modulation. The 400 cycle signal from receiver 19 is filtered by means of circuit 20, and fed to a differential rectifier circuit 21 over transformer 21a. In the differential rectifier 21 the phase of the 400 cycle signal from source 15 is applied over transformer 15a and compared with the phase of the 400 cycle voltage from source 15. It will be noted that differential detector 21 with rectifiers 30 and 31 and associated circuit elements constitutes a conventional phase discriminator, the voltage being applied in 90° phase relation for on course heading. If the voltages applied to the discriminator approach like phase a D. C. voltage of a given polarity will be produced by the differential rectifier, but if the voltages depart further in phase then the D. C. voltage will be of opposite polarity. The magnitude of the D. C. voltages depends upon the departure from normal phase relationship. This D. C. voltage is applied to a homing indicator 22, as for example a zero center meter, and the deflection of the meter read to give the departure of the heading of the airplane from the line between the plane and the radio transmitting station 3.

As indicated previously the heading signal may be substituted for the rate signal in an automatic approach equipment. The voltages from the homing indicator 22 and the localizer course indicator 23 derived from the output of the receiver 19 are fed into the automatic approach unit 24. If both signals are zero, the airplane is on the localizer course and headed toward the station, and no signal will be fed to the automatic approach unit 24. If the plane is off the course, the indicator signal will operate the automatic pilot 25 to cause the plane to turn toward the course. However, as the plane turns away from a heading toward the station, the homing indicator 22 develops a signal, which is opposed to the displacement signal, and causes the plane to turn more slowly. When the signal from the homing indicator equals the signal from the course indicator the plane will be in level flight, headed toward the course. As the plane nears the course, the displacement signal drops off. The heading signal then causes the plane to turn toward the station and, as the plane turns, the heading signal also drops off. This continues until the plane reaches the course and is headed toward the station.

Figure 4:
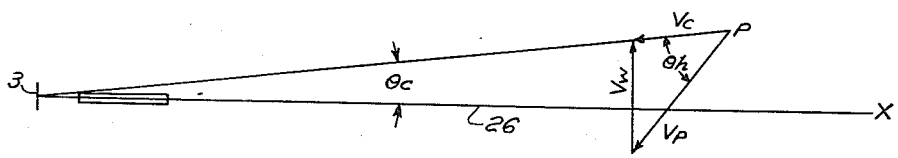
Fig. 4 is a vector diagram illustrating the effects of the cross winds on the functioning of the approach unit.

In the absence of cross-wind the arrangement so far described will give an entirely adequate and satisfactory control. However, in the presence of a cross-wind of uniform velocity the airplane will take up a new stable heading off the course. This is shown in Fig. 4. In that figure, 3 is the localizer ground station; 26 the localizer course, $\theta_c$ the displacement of the airplane from the course, $\theta_H$ the angle between the heading of the airplane and line from the plane to the ground station (heading error). $V_p$ is the velocity of the airplane (air speed), $V_w$ is the cross-course wind velocity, $C_c$ is the component of the airplane's velocity toward the ground station. Thus, if an off course displacement of ½° will produce a 10° bank of the airplane, and a heading departure of 5° will produce a 10° bank, then a cross wind that requires a 5½ crab angle to maintain a course will displace the airplane ½° from the course. The ½° displacement from course changes the heading reference ½°, and adds ½° to the crab angle.

The cross-wind corrector is used to cause the plane to return substantially to course in the presence of cross-winds. In addition to the course and homing indicators 23 and 22 respectively, a cross-wind signal generator 26 is added, and the results of the three signal sources is fed to the automatic approach unit 24. The cross-wind generator 26 is controlled by signals from the course indicator 23. If it is assumed that the craft is on course and headed toward the station the output signal from the localizer indicator will be zero, as will the homing indicator. A steady cross wind will tend to blow the airplane off course. This will result in a signal from the localizer indicator as well as from the homing indicator. Because of this a crab angle must be assumed by the plane which will result in a continuous output from the homing indicator even though the signal from the localizer indicator is zero. To compensate this effect the signal resulting from departure from course is used through amplifier 27 to drive a motor 28 which in turn controls adjustment of cross-wind generator 26. Generator 26 may comprise a potentiometer 32 coupled to a direct current source and provided with an adjustable tap 33. Motor 28 will drive the center tap in a direction to produce a voltage tending to balance the voltage developed by the homing indicator. As the craft is an angle to the course in order to stay on course in the presence of the cross wind the adjustment of the cross wind generator will stabilize at a value sufficient to compensate for the deviation in heading of the craft. In a preferred embodiment, small values of off course indication are arranged to cause the cross wind motor 28 to run at full speed. However the signal generator 26 is connected to the motor through a large reduction gear so that the cross-wind corrections cause the plane to change its heading very slowly, as for example not more than 5° per minute. Thus, if a wind is holding the plane off course, the cross wind correction will cause the plane to turn even more toward the course than is required by the displacement signal, and the plane will move toward the course at a limited rate. When the plane is on the course, the cross-wind corrector signal will equal the heading signal, and will be sufficient to maintain the crab angle required to make good the course. In view of the fact that the off course correction due to the cross wind effects are applied relatively slowly the plane will in general be on course at the proper crab angle to fly therealong, despite the cross wind effects. However, should the correction be too great the plane will then depart on the opposite side of the course line and the course wind amplifier will then cause the direction to be changed so as to tend to cause the plane to return to course. After one or two crossings of this type the hunting will substantially cease and the plane will stabilize along the desired course line.

While I have described above the principles of my invention in connection with specific apparatus, and particular modifications thereof it is to be clearly understood that this description is made only by way of example and not as a limitation on the scope of my invention.

What is claimed is:

1. In a system for producing a control voltage for guiding an aircraft in response to beacon course-defining radio signals and to a homing direction finding signal from said beacon comprising a pair of spaced antennas for receiving energy radiation from said beacon, a local source of modulating signals for modulating said received energy with signals from said local source, means for segregating said course defining signals and the local modulation signals from said received energy, means for deriving from said separated signals, energy corresponding with the departure of said craft from the course defined by said beacon and homing signal energy corresponding with the heading of said craft with respect to said beacon, means responsive to departure from course of said craft for deriving a third signal energy indicative of the direction of departure from said course but substantially independent of the degree of said departure, and means for combining said homing and said heading signal energy and for combining said third signal energy in opposition with said first combined energies to provide a resultant control voltage.

2. An arrangement according to claim 1, wherein said means for deriving homing signal energy comprises means for deriving sum and difference components of the outputs of said antennas, said means for modulating comprises means for modulating one of said components with said local signals, means for providing a relative phase shift between said modulated and unmodulated components, and means for combining said modulated component and said unmodulated component after said phase shift.

3. An arrangement according to claim 1, further comprising a conjugate bridge circuit, means for applying the output of each antenna to one set of diametrically opposite junction points of said bridge, said means for modulating comprising means for modulating the antenna outputs available at one junction point of the other set of diametrically opposite junction points of said bridge with said low local signals, and means for combining said modulated outputs with the antenna outputs available at the other junction point of said last named set of junction points.

4. An arrangement according to claim 1, further comprising, means for deriving sum and difference components of the outputs of said antennas, said means for modulating comprising means for modulating one of said components with said modulating signals, said means for deriving said homing signal energy comprising means for providing a relative phase shift between said modulated and unmodulated components, and means for combining said modulated component and said unmodulated component after said phase shift, means for detaching the modulation of said combined components, and means for comparing the phase of said detected components with the phase of the signals from said source to derive said homing signal.

5. In a system for producing a control voltage guiding an aircraft in response to beacon-course defining radio signals and to a homing direction finding signal from said beacon comprising a pair of spaced antennas for receiving energy radiation from said beacon, a conjugate bridge circuit, means for applying the output of each antenna to one set of diametrically opposed junction points of said bridge circuit, a local source of modulating signals for modulating said receiver energy with signals from said local source, said means for modulating comprising means for modulating the antenna outputs available at one junction point and the other set of diametrically opposed junction points of said bridge with said low frequency signals, and means for combining said modulating outputs with the antenna outputs available at the other junction point of said last named set of junction points, means for segregating said course defining signals and the local modulation signals derived from said received energy, means for deriving from said segregated signals, energy corresponding with the departure of said craft from the course defined by said beacon and homing signal energy corresponding with the heading of said craft with respect to said beacon, and means for combining said energy to provide a resultant control voltage.

References Cited in the file of this patent

UNITED STATES PATENTS

| Number | Name | Date |
|---|---|---|
| 1,315,539 | Carson | Sept. 9, 1919 |
| 1,958,258 | Alexanderson | May 8, 1934 |
| 2,188,556 | Nickel | Jan. 30, 1940 |
| 2,257,757 | Moseley | Oct. 7, 1941 |
| 2,272,056 | Carlson | Feb. 3, 1942 |
| 2,280,117 | Crane et al. | Apr. 21, 1942 |
| 2,372,185 | Wittkuhns | Mar. 27, 1945 |
| 2,403,727 | Loughren | July 9, 1946 |
| 2,419,970 | Roe et al. | May 6, 1947 |
| 2,482,809 | Thompson | Sept. 27, 1949 |
| 2,484,862 | Streeter | Oct. 18, 1949 |
| 2,502,721 | Halpert | Apr. 4, 1950 |
| 2,536,683 | Germaix | Jan. 2, 1951 |
| 2,540,413 | Aicardi | Feb. 6, 1951 |
| 2,575,890 | Perkins et al. | Nov. 20, 1951 |
| 2,613,350 | Kellogg | Oct. 7, 1952 |
| 2,632,135 | Carpenter | Mar. 17, 1953 |
| 2,634,925 | Kutzler | Apr. 14, 1953 |

FOREIGN PATENTS

| Number | Country | Date |
|---|---|---|
| 516,567 | Great Britain | Jan. 5, 1940 |
| 594,484 | Great Britain | Nov. 12, 1947 |